No. 631,810. Patented Aug. 29, 1899.
H. G. OSBURN.
SEPARATOR FOR ACCUMULATOR PLATES.
(Application filed Oct. 26, 1898.)
(No Model.)
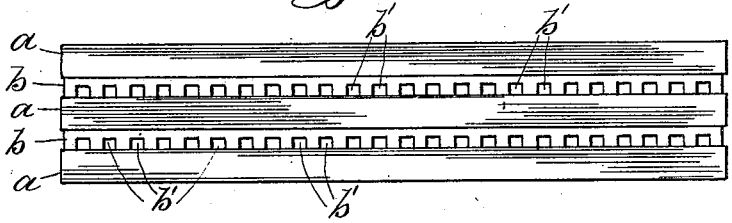
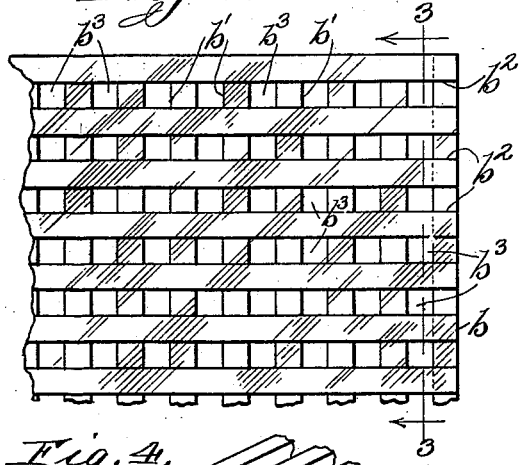
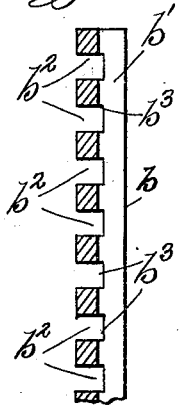
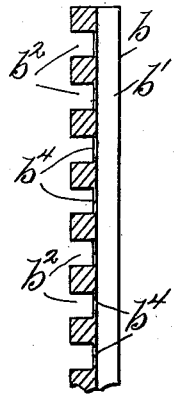
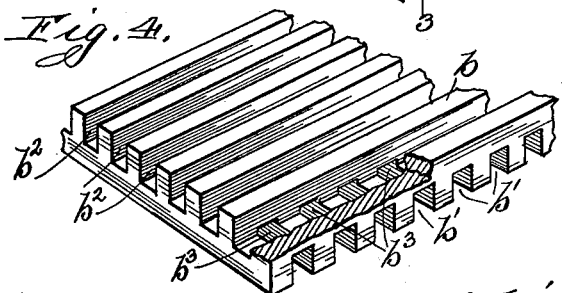
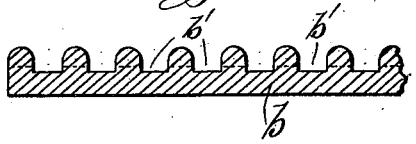
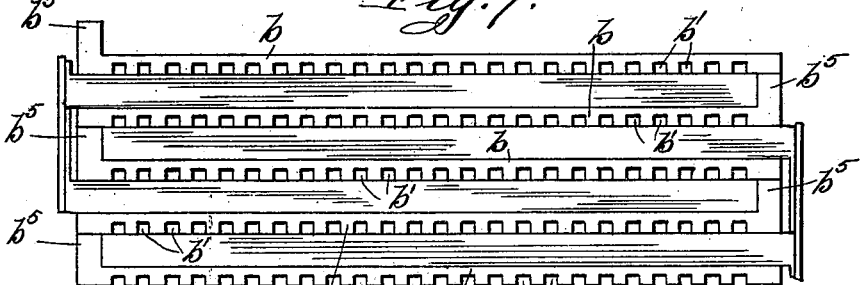
Witnesses:
W. J. Jaeker,
M. D. Rochford
Inventor:
Harry G. Osburn
By Ludington & Jones
Attorneys
THE NORRIS PETERS CO., PHOTO-LITHO., WASHINGTON, D. C.

UNITED STATES PATENT OFFICE.

HARRY G. OSBURN, OF CHICAGO, ILLINOIS.

SEPARATOR FOR ACCUMULATOR-PLATES.

SPECIFICATION forming part of Letters Patent No. 631,810, dated August 29, 1899.

Application filed October 26, 1898. Serial No. 694,577. (No model.)

*To all whom it may concern:*

Be it known that I, HARRY G. OSBURN, a citizen of the United States, residing at Chicago, in the county of Cook and State of Illinois, have invented a certain new and useful Improvement in Separators for Accumulator-Plates, of which the following is a full, clear, concise, and exact description, reference being had to the accompanying drawings, forming a part of this specification.

My invention relates to a separator for accumulator-plates, my object being to provide an economical and efficient separator adapted to be placed between the plates of an accumulator or storage battery to effectually separate the same while permitting the electrolyte to freely circulate and to make effective contact with the active material of the plates.

In accordance with my invention I provide a separator in the form of a plate or sheet formed, preferably, of wood, the plate having a series of channels extending across one face thereof and having on the opposite face a series of channels extending at an angle thereto, whereby the two sets of channels intersect and form transverse openings or passages through the plate at intervals. I usually arrange the channels so that those upon one face will be at right angles to those upon the other face and so that the grain of the wood will extend at an angle to both sets of channels. In practice the plate is formed rectangular in shape, with the channels upon one face parallel to one pair of edges and the channels upon the other side parallel to the other pair of edges, the grain of the wood extending diagonally across the plate. I preferably employ cypress-wood, since this wood is quite pervious, whereby the electrolyte is permitted to permeate the wood and come into intimate contact with the active material of the plate at points where the faces of the ridges left between the channels press against the battery-plate. Furthermore, cypress-wood is not affected like other woods by the acids in the electrolyte and does not readily carbonize. In some cases I have formed the ridges left between the channels with curved faces, whereby the separator will make contact with the battery-plates only along a series of lines instead of along a series of flat surfaces. Furthermore, instead of making the series of channels upon the opposite faces of the plate of such depth that transverse openings are formed completely through the plate, the channels may be of such depth that their combined depth is not quite equal to the thickness of the plate or sheet, whereby a thin paper-like film is left at the openings where the transverse holes would otherwise be. These thin paper-like partitions will be pervious to the electrolyte and will be found advantageous in some forms of plates where the active material is liable to fall down and pass through the openings to thereby short-circuit the adjacent battery-plates. I consider it preferable, however, to make the recesses of sufficient depth to form a series of transverse openings extending completely through the plates, as the resistance of the battery is thereby materially decreased. In either case transverse fluid-paths will be provided at intervals, due to the angular arrangement of the series of channels provided upon the opposite faces of the sheet, which paths will permit the electrolyte to readily pass through the same. Instead of making the separator of wood, other non-conducting materials may be employed, although I have secured the best results by the employment of wood, as above described. The provision of intersecting channels upon the opposite sides of the separator leaves the channels and openings in the separator for the reception of the electrolyte, thereby materially decreasing the internal resistance of the battery, and, furthermore, the intersecting channels form passages which permit the electrolyte to freely circulate during the operation of the battery, it being well known that the specific gravity of the electrolyte changes during the operation of the battery, and these intersecting channels thus permit the electrolyte to freely circulate to bring fresh liquid in contact with the active material of the battery-plates. Furthermore, the vertical or upwardly-extending channels permit gases evolved from the electrolyte to readily escape.

In the prior art separators for batteries have usually been formed of sheets of felt, paper, or the like interposed between the battery-plates; but this class of separators has not afforded satisfaction, since the separator when permeated with the electrolyte becomes soft and loses its lineal rigidity and frequently falls or settles downward between the battery-plates. Furthermore, it becomes so soft and weakened that when the battery is disassembled the separator will be mutilated and destroyed. Flat solid wooden sheets or plates have also been employed; but these prevent the ready circulation of the electrolyte and unduly increase the resistance of the cell and do not readily accommodate themselves to unevenness in the surfaces of the accumulator-plates. The separator of the present invention possesses lineal rigidity due to the material of which it is made, and, furthermore, because of the channels upon the opposite faces thereof it is easily flexible and readily adapts itself to the uneven surfaces of the battery-plates, and, further, the removal of considerable material by the formation of the channels renders the separator very light, the question of weight being an important item in storage-battery manufacture.

I have illustrated my invention in the accompanying drawings, in which—

Figure 1 is an end view of a number of battery-plates associated with the separator of my invention. Fig. 2 is a face view of the separator. Fig. 3 is a sectional view on line 3 3, Fig. 2. Fig. 4 is a perspective view of the separator, the corner thereof being partially broken away. Fig. 5 is a sectional view of a modification. Fig. 6 is a further sectional view of a modification. Fig. 7 is a view of a plurality of battery-plates employed in connection with a form of the separator having a ledge or flange at the edge.

Like letters refer to like parts in the several figures.

Between the battery-plates $a$ $a$ the separators $b$ $b$ are placed, the separator carrying upon one face a series of channels $b'$ $b'$, extending across the same and of a depth usually slightly more than one-half of the thickness of the separator. Upon the opposite face of the separator a series of channels $b^2$ $b^2$ is provided, these channels extending at right angles to the channels $b'$ $b'$ and likewise being of a depth slightly greater than one-half of the thickness of the separator. At the intersections of the channels a series of transverse openings or passages $b^3$ $b^3$ result, these passages, as shown in Figs. 2, 3, and 4, extending completely through the plate. Instead, however, of having the transverse passages for the passage of the electrolyte extending completely through the plate the channels may be so arranged that their combined depth will be slightly less than the thickness of the separator, as shown in Fig. 5, whereby thin paper-like partitions $b^4$ $b^4$ are formed in the path of the transverse passages. As above described, these thin partitions permit the ready passage of the electrolyte therethrough by absorption. When the separators rest in position between the faces of the battery-plates, the electrolyte within the channels will have free access to the active material on the face of the battery-plates. Where the faces of the ridges left between the channels rest against the plates, the electrolyte may to a certain extent pass between the opposed surfaces; but due to the fact that the wood of which the separator is made is pervious to the electrolyte to a degree the electrolyte finds ready access to the active material lying in contact with the faces of the ridges. Instead, however, of leaving the faces of the ridges flat, as shown in Fig. 1, they may be rounded or tapered off toward the surface, as shown in Fig. 6.

In Fig. 7 I have illustrated a modification wherein a ridge or flange $b^5$ is provided at the edge of the separator, adapted to overlap the end of the battery-plate, the face of the adjoining separator being arranged to rest against the face of the ridge, whereby the end of the battery-plate is completely inclosed and the loosened active material thereby prevented from making contact with the adjoining battery-plate, which is of opposite polarity. By arranging the separators with the ridges thereon alternately at opposite ends of the battery-plates the positive plates are left projecting from the separators upon one side, while the negative plates project from the separators upon the opposite side, and all danger of short-circuiting of the plates is thus effectively prevented.

Having described my invention, what I claim as new, and desire to secure by Letters Patent, is—

1. A separator for accumulator-plates formed of a plate or sheet of non-conducting material having upon one face a series of channels, and upon the other face a series of channels angularly arranged relatively thereto, to leave at intervals transverse fluid-paths through the plate, substantially as described.

2. A separator for accumulator-plates formed of a plate or sheet of non-conducting material having upon one face a series of channels and upon the other face a series of channels extending at an angle thereto, the channels being of sufficient depth to leave at the intersections transverse openings through the plate, substantially as described.

3. A separator for accumulator-plates formed of a plate or sheet of non-conducting material having a grain, as wood, and having upon one face a series of channels and upon the other face a series of channels extending at an angle thereto to leave at the intersections transverse fluid-passages through the plate, the channels on each face being arranged to extend at an angle to the grain of the material, substantially as described.

4. A separator for accumulator-plates, formed of a plate or sheet of non-conducting material having a grain, as wood, and having upon one face a series of channels and upon the other face a series of channels extending at right angles thereto, said channels being arranged to extend at an angle of about forty-five degrees to the grain of the material, substantially as described.

5. A separator for accumulator-plates formed of a plate or sheet of non-conducting material having a grain, as wood, said plate being substantially rectangular and having upon one side a series of channels parallel to one pair of edges and upon the other side a series of channels parallel to the other pair of edges, the grain of the material extending diagonally across the plate, substantially as described.

6. A separator for accumulator-plates formed of a plate or sheet of non-conducting material having upon one face a series of channels and upon the other face a series of channels extending at an angle thereto, said plate carrying at the edge a laterally-extending ledge or flange adapted to overlap the end of the adjacent accumulator-plate, substantially as described.

7. In combination, a pair of accumulator-plates, and a separator between the same formed of a plate or sheet of non-conducting material having upon one face a series of channels and upon the other face a series of channels angularly arranged relatively thereto to leave at intervals transverse fluid-paths through the separator, substantially as described.

8. In combination, a pair of accumulator-plates, and a separator between the same formed of a plate or sheet of non-conducting material having upon one face a series of channels and upon the other face a series of channels intersecting the same, the channels being of sufficient depth to leave at the intersections transverse openings through the separator, substantially as described.

In witness whereof I have hereunto subscribed my name in the presence of two witnesses.

HARRY G. OSBURN.

Witnesses:
 W. CLYDE JONES,
 M. R. ROCHFORD.